United States Patent
Robert (10) Patent No.: US 7,334,462 B2
(45) Date of Patent: Feb. 26, 2008

(54) METHOD AND SYSTEMS FOR MEASURING THE DEGREE OF WEAR ON A TIRE

(75) Inventor: Michel Robert, Cellule (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/783,863

(22) Filed: Apr. 12, 2007

(65) Prior Publication Data
US 2007/0245819 A1    Oct. 25, 2007

Related U.S. Application Data (60) Division of application No. 10/902,558, filed on Jul. 29, 2004, now Pat. No. 7,204,135, which is a continuation of application No. PCT/EP03/00888, filed on Jan. 29, 2003.

(30) Foreign Application Priority Data
Jan. 31, 2002    (FR)    ................... 02 01180

(51) Int. Cl.
    *G01M 17/02*    (2006.01)
(52) U.S. Cl. ........................................ 73/146
(58) Field of Classification Search ........ 73/146–146.8
    See application file for complete search history.

(56) References Cited

U.S. PATENT DOCUMENTS

| | | | |
|---|---|---|---|
| 3,964,303 A | 6/1976 | Vexelman et al. | |
| 5,365,668 A | 11/1994 | Canovas et al. | |
| 6,666,080 B2 | 12/2003 | Buist et al. | |
| 6,763,288 B2 | 7/2004 | Caretta et al. | |
| 7,051,584 B2 | 5/2006 | Robert et al. | |
| 2005/0081617 A1 | 4/2005 | Sergio et al. | |

FOREIGN PATENT DOCUMENTS

| | | |
|---|---|---|
| DE | 197 45 734 | 4/1999 |
| DE | 202 16 290 U1 | 1/2003 |
| EP | 0 937 615 | 8/1999 |
| EP | 0 989 394 | 3/2000 |

*Primary Examiner*—Andre J. Allen
(74) *Attorney, Agent, or Firm*—Buchanan Ingersoll & Rooney PC (57) ABSTRACT

A method for detecting wear on a tire at one or more predetermined wear thresholds in tread pattern elements of the tire includes the steps of allocating a discrete wear variable to the tread pattern element to a discrete impedance variable representing the impedance of a passive tuned circuit contained in at least one of the elements. A system according to the invention for implementing this method comprises a detection unit intended to be incorporated in a tire and containing the passive circuit which is covered with rubber, the passive circuit comprising a coil and n ($n \geq 1$) capacitor or capacitors connected in parallel to the terminals of the coil, and an active interrogation circuit to which the passive circuit is coupled, which is mounted fixed to the wheel and which comprises a frequency-sweep energy generator and a means of detecting the tuning frequencies between the passive circuit and the interrogation circuit.

25 Claims, 3 Drawing Sheets

METHOD AND SYSTEMS FOR MEASURING THE DEGREE OF WEAR ON A TIRE

This application is a Division of U.S. Ser. No. 10/902,558 filed on Jul. 29, 2004, now U.S. Pat. No. 7,204,135 issued on Apr. 17, 2007, and which is a continuation of International PCT/EP03/00888 filed on Jan. 29, 2003.

BACKGROUND AND SUMMARY OF THE INVENTION

The present invention concerns a method of detecting when a tire reaches one or more predetermined wear thresholds, which may be detected when the tire is stopped or while running. The invention also concerns a detection unit intended to be incorporated in such a tire for implementing this method, a tread pattern element for such a tire comprising this unit, a tire tread provided with this unit, and a tire comprising this tread. The invention also comprises a system of implementing this method comprising this unit, a tire/wheel assembly for a motor vehicle and such a vehicle comprising this system.

It is known how to provide wear detectors for tread patterns on tires for motor vehicles.

The German patent document DE-A-197 45 734 concerns a wear detector for a tire which forms part of the tire (see FIGS. 2 and 3 of this document). More precisely, in the mass of a tread pattern strip on the tire, metallic wires are provided, forming electrically conductive loops which extend at different heights from the top of the bar and which are connected to a detection circuit contained in the tread on the tire, radially below the tread strip.

When a vehicle equipped with this tire is running, these loops are broken successively because of the wear on the strip, so that they form open switches, and the detection circuit delivers a signal representing these breaks to an assessment unit present in the vehicle.

One major drawback of the wear detector described in this document is that the detection circuit can comprise electrically active components in the mass of the tire.

One aim of the present invention is to propose a method of detecting one or more predetermined wear thresholds on a tire comprising tread pattern elements, which remedies this drawback.

To this end, the detection method according to the invention comprises the assigning a discrete wear variable representing the wear on the element to a discrete impedance variable representing the impedance of a passive tuned circuit contained in at least one of the tread pattern elements.

According to another characteristic of the invention, the method comprises the measurement of resonant frequencies of the tuned circuit which represent, respectively, values of the impedance variable and a comparison of each of these measured frequencies with one or more reference resonant frequencies. The reference resonant frequencies each represent a wear state on the element which does not reach at least one of the thresholds.

According to another characteristic of the invention, the tuned circuit comprises a coil and at least a quantity n ($n \geq 1$) capacitor(s) connected in parallel to the terminals of the coil, the impedance variable being a function of the inductance of the coil or of the capacitance of the capacitor or capacitors, the inductance (the first case) or the capacitance (the second case) being designed to vary discretely when the wear threshold or thresholds are reached.

In a first embodiment, this method is such that a discrete increase in the inductance represents the tire reaching a wear threshold or thresholds, measured by a discrete reduction in the resonant frequency.

According to another aspect of the first embodiment, and considering that the tread pattern elements are intended to be in contact with the ground through their respective external faces, the method provides the coil with one or more short-circuit conductive lines each comprising a vertex which is contained inside a tread pattern element and which is directed towards the external face of the tread pattern element, the respective vertices being situated at different heights in the radial direction of the tire, a wear threshold being reached when the external face of a tread pattern element has broken the vertex of a conductive line.

According to a second embodiment, the method includes the step of determining that a discrete reduction in the capacitance has occurred, the discrete reduction representing the tire reaching a threshold or one of the thresholds, this reaching then being measured by a discrete increase in the resonant frequency.

Further to the second embodiment, and considering again that the tread pattern elements are intended to be in contact with the ground through their respective external faces, the method comprises the step of determining the discrete reduction in capacitance measured in at least two capacitors, each provided with at least one conductive branch, wherein two or more branches are arranged in parallel, the at least one branch comprising a vertex which is contained inside the tread pattern element and which is directed towards the external face of the tread pattern element, two adjacent capacitors being connected together by at least one branch, the vertices respectively relating to pairs of adjacent capacitors being situated at different heights in the radial direction of the tire, and the wear threshold or thresholds being reached when the external face has broken the vertex of the branch or one of the branches.

Advantageously, the impedance variable is measured over all or part of the width of the tire (i.e. the axial dimension thereof.

It should be noted that this method according to the invention makes it possible to indirectly detect the breaking of the short-circuit line or lines or parallel branches by measuring resonant frequencies, providing only electrically passive components in the tire.

In the present description, "vertex" means the portion of the short-circuit line or lines or parallel branch which is closest to the external face of the corresponding tread pattern element, in the radial direction of the tire.

According to one embodiment of the invention, the or each short-circuit line or parallel branch forms substantially an inverted U, whose connecting web (which may be straight or curved for example) forms the aforementioned vertex and is contained inside one of the tread pattern elements so that the web or its tangent are substantially parallel to the external face of the element.

According to a variant embodiment of the invention, the at least one short-circuit line or parallel branch forms substantially an inverted V, whose vertex is consequently practically at one point.

Another aim of the invention is to propose a detection unit intended to be incorporated in a tire for implementing the method according to the invention for detecting the reaching of one or more predetermined wear thresholds.

To this end, a tire casing according to the invention contains a passive electrical circuit which is covered with a rubber composition which can be used in the tread of the tire and which comprises a coil printed on a substrate and a quantity n (n≧1) capacitors connected in parallel to the terminals of the coil, and in that:

in a first embodiment, the coil is provided with one or more short-circuit lines each comprising a vertex which is contained inside the unit, the vertices being situated at different heights on the coil, or in a second embodiment, each capacitor is provided with one or more branches in parallel, each comprising a vertex which is contained inside the casing, two adjacent capacitors being connected together by one or more branches, the vertices respectively relating to adjacent pairs of capacitors situated at different heights on the capacitors.

According to an example embodiment of the invention relating to the first case, the coil is provided with a single short-circuit line connecting a terminal of the coil to a turn thereof According to another example embodiment of the invention relating to the first case, the coil is provided with a quantity m (m≧2) short-circuit lines connecting the same terminal of the coil to a same quantity m turns thereof, the respective heights of the line vertices as from the coil decreasing in the direction of the turns approaching the terminal.

According to an example embodiment of the invention relating to the second case, the passive circuit comprises two capacitors which are connected in parallel to the terminals of the coil and which are connected together by the branch in parallel or by a pair of such branches, the respective vertex or vertices of which occupy one and the same height from the capacitance, for detecting a single wear threshold on the tread pattern element containing the vertex or vertices.

According to another example embodiment of the invention relating to the second case, the passive circuit comprises at least three capacitors which are connected in parallel to the terminals of the coil and which are connected in pairs to each other by a branch in parallel or by a pair of such branches, so that the circuit comprises at least two branches whose respective vertices occupy different heights from the capacitors for detecting at least one intermediate wear threshold on the tread pattern element containing the vertices.

Another aim of the invention is to propose a tread pattern element for a tire intended to be attached to the tread of the tire, for implementing the aforementioned method according to the invention.

To this end, a tread pattern element according to the invention comprises a detection unit as defined previously, the tread pattern element comprising a base intended to be fixed to the tread, an external face intended to be in contact with the ground and the passive electrical circuit between the base and the external face, the vertex of the at least one short-circuit line or branch in parallel being adjacent to the external face and being situated so as to be recessed from the external face.

"Tread pattern element" means in the present description any element in relief which is intended to be in contact at one time or another with the ground following its incorporation in the tread, i.e. at the very start of running, or after wear on this element has begun. This element can thus consist of a block, for example, substantially parallelepiped or cylindrical in shape, or a circumferential rib with a variable transverse section (i.e. extends over all or part of the circumference of the tread).

It should be noted that the tread pattern element according to the invention can advantageously consist of a "wear indicator", for example, in the form of a block or rib with a height substantially less than that of the tread pattern elements which are intended to be in contact with the ground from the start of running.

Another aim of the invention is to propose a tread for a tire and such a tire, for implementing the method according to the invention for detecting the reaching of one or more wear thresholds.

According to a first embodiment of the invention, a tread according to the invention is such that it comprises at least one tread pattern element such as the aforementioned, and a tire according to the invention is such that it comprises the tread.

It should be noted that a tire according to the invention might not include the unit according to the invention but only the passive electrical circuit according to the invention, which would then be without the rubber composition which coats this electrical circuit in order to form the unit.

Advantageously, the tread according to the invention also comprises a conductive short-circuit loop which is substantially parallel to the external face of the tread and which connects together the terminals of the tuned circuit for measuring the wear on all or part of the width of the tread when the loop is cut by the external face because of the wear.

According to a second embodiment of the invention, a tire for implementing the wear detection method comprises a carcass reinforcement which is radially surmounted by a crown reinforcement and which is extended laterally by side walls, a tread comprising tread pattern elements radially surmounting the crown reinforcement. This tire comprises the detection unit according to the invention, this unit being substantially in the shape of a tack whose head is connected to a radially internal face of the tire facing one of the tread pattern elements and whose stem contains said short-circuit line or lines or branch or branches in parallel and extends radially through the tire from the radially internal face and as far as the inside of the tread pattern element.

It should be noted that the tires according to these first or second modes comprise only electrically passive components in their mass.

Another aim of the invention is to propose a tire/wheel assembly for a motor vehicle comprising a wheel and a tire mounted on the wheel, for implementing the aforementioned wear detection method according to the invention.

To this end, the tire/wheel assembly according to the invention is such that the tire corresponds to the first or second aspects according to the invention, and that the passive electrical circuit in the tire is coupled to an active interrogation circuit which is fixedly mounted to the wheel and which comprises a frequency-sweep energy generator and means for detecting the tuning frequencies between the passive circuit and the interrogation circuit.

According to a preferred embodiment of the invention, the interrogation circuit comprises, in addition to the generator, a capacitor, a resistance and a coil coupled to the coil of the passive circuit, and the tuning frequency detection means is then connected to the terminals of the resistance to measure the voltage at these terminals.

According to an example embodiment of the invention, the interrogation circuit is mounted on an inflation valve of the wheel (i.e. an instrumented valve).

According to a variant embodiment of the invention, the interrogation circuit is mounted on a module for measuring the internal pressure of the tire mounted on the wheel.

According to another variant embodiment of the invention, the interrogation circuit is mounted directly on the wheel rim.

According to another characteristic of the invention, the interrogation circuit is provided with transmission means intended to transmit tuning frequency information to a central unit which is portable or mounted inside the vehicle, which central unit is intended to inform a user that at least one predetermined wear threshold of the tire has been reached.

Another aim of the invention is to propose a motor vehicle comprising a chassis, tire/wheel assemblies and a suspension device providing a flexible connection between the chassis and the tire/wheel assemblies, for implementing the aforementioned wear detection method according to the invention.

To this end, the vehicle according to the invention is such that it is equipped with at least one tire according to the first or second aspects according to the invention, and comprises on the chassis or on the suspension device an active interrogation circuit to which there is coupled the passive electrical circuit contained in the tire, the interrogation circuit comprising a frequency-sweep energy generator and a means of detecting the tuning frequencies between the passive circuit and the interrogation circuit.

According to another preferential characteristic of this vehicle, this interrogation circuit also comprises a capacitor, a resistance and a coil coupled to the coil of the passive circuit, and this tuning frequency detection means is connected to the terminals of this resistance in order to measure the voltage at these terminals.

According to one example embodiment of the invention, the interrogation circuit is mounted on a wall of the chassis corresponding to the wheel passage area.

According to a variant embodiment of the invention, the interrogation circuit is mounted on the suspension device, for example, on a suspension arm or on a damper cup forming a stop, on which a damper spring of the suspension arm bears.

According to another characteristic of this vehicle according to the invention, the interrogation circuit is provided with transmission means intended to transmit tuning frequency information to a central unit which is portable or mounted inside the vehicle, which central unit is intended to inform a user that a predetermined wear threshold of the tire has been reached.

Another aim of the present invention is to propose a detection system for implementing the method according to the invention for detecting that one or more predetermined wear thresholds of a tire have been reached.

This system comprises the detection unit according to the invention and an active interrogation circuit to which the passive circuit of the unit is coupled, this interrogation circuit comprising a frequency-sweep energy generator and a means of detecting the tuning frequencies between the passive circuit and the interrogation circuit.

The interrogation circuit preferably comprises, in addition to this generator, a capacitor, a resistance and a coil coupled to the coil of the passive circuit, and this tuning frequency detection means is then connected to the terminals of the resistance in order to measure the voltage at these terminals.

Also preferentially, this interrogation circuit is provided with transmission means intended to transmit tuning frequency information to a central unit, which may be portable or mounted inside a vehicle and intended to inform a user that a predetermined wear threshold of the tire has been reached.

BRIEF DESCRIPTION OF THE DRAWINGS

The aforementioned characteristics of the invention, as well as others, will be understood better from a reading of the following description of an example embodiment of the invention given by way of illustration and non-limitingly, the description to be read in conjunction with the accompanying drawings, amongst which.

DETAILED DESCRIPTION

Figure 1:
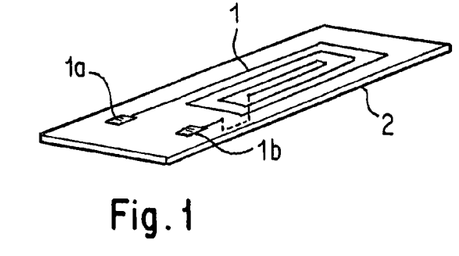
FIG. 1 is a schematic perspective view of a coil printed on a substrate which is used for manufacturing a tuned circuit forming part of a wear measuring system according to the invention.

FIG. 1 depicts a coil 1 comprising terminals 1a and 1b which is printed in a known manner on a flat substrate 2.

Figure 2:
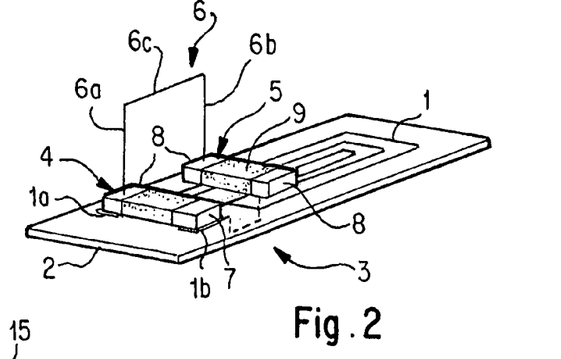
FIG. 2 is a schematic perspective view of a tuned circuit of the LC type according to one example embodiment of the invention, which is manufactured from the printed coil of FIG. 1.

FIG. 2 depicts a tuned circuit 3 of the LC type which is obtained from the printed coil 1 according to an example embodiment of the invention. This electrically passive tuned circuit 3 comprises two capacitors 4 and 5 which are connected in parallel by a pair of conductive bypass wires 6 and 7 and which are electrically connected to the coil 1. As can be seen in FIG. 2, one of the capacitors 4 is connected directly to the terminals 1a, 1b of the coil 1 while the other capacitor 5 is connected in parallel with respect to the capacitor 4.

Each capacitor 4, 5 consists in a known manner of two conductive plates 8 connected together by a dielectric 9. In the example in FIG. 2, one of the bypass wires 6, for example made from copper, connects the two capacitors 4 and 5 together (i.e. on only one side of the substrate 2) whilst forming a loop in an inverted U, the wings 6a and 6b of which are respectively fixed to the facing plates 8 of the capacitors 4 and 5 and the web 6c of which forming a vertex is substantially parallel to the plane of the substrate 2.

Figure 3:
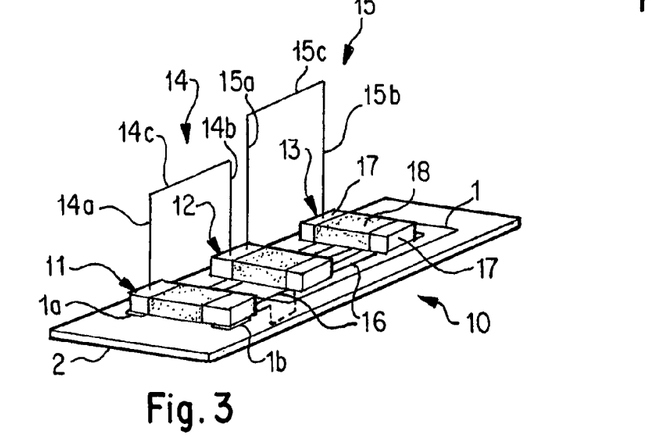
FIG. 3 is a schematic perspective view of a tuned circuit of the LC type according to a further example embodiment of the invention, which is manufactured from the printed coil of FIG. 1.

FIG. 3 depicts a tuned circuit 10 of the LC type according to a variant embodiment of the invention, which is also obtained from the printed coil 1 of FIG. 1. This tuned circuit 10 comprises three capacitors 11, 12 and 13 which are connected in parallel by means of two pairs of conductive bypass wires 14, 15, 16 connecting them in pairs together and which are electrically connected to the coil 1. As can be seen in FIG. 3, one of the capacitors 11 is directly connected to the terminals 1a, 1b of the coil 1 whilst the other two capacitors 12 and 13 are connected in parallel with respect to the capacitor 11.

Each capacitor 11, 12, 13 consists of two conductive plates 17 connected together by a dielectric 18.

In the example in FIG. 3, one of the bypass wires 14, for example made from copper, connects together the adjacent capacitors 11 and 12 on one side of these like the wire 6 in FIG. 2, forming a loop in an inverted U, whose wings 14a and 14b are respectively fixed to the facing plates 17 of the capacitors 11 and 12 and the web 14c of which is substantially parallel to the plane of the substrate 2.

On the same side as the substrate 2, another bypass wire 15, for example made from copper, connects together the adjacent capacitors 12 and 13 forming a loop in an inverted U whose wings 15a and 15b are respectively fixed to the plates 17 of the capacitors 12, 13 and whose web 15c is substantially parallel to the plane of the substrate 2.

As can be seen in FIG. 3, the wings 14a and 14b of the wire 14 have a different height than the wings 15a and 15b of the wire 15, which means that the webs 14c and 15c of the wires 14 and 15, which are substantially parallel to the plane of the substrate 2, are situated at different distances from the substrate 2.

Figure 4:
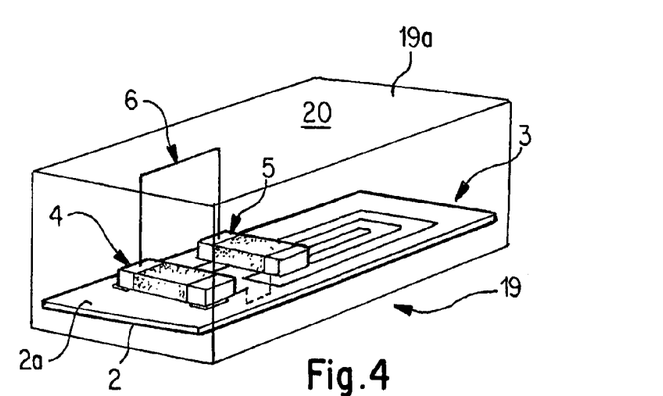
FIG. 4 is a schematic perspective view of the tuned circuit according to the example in FIG. 2 which is covered with a coating composition.

FIG. 4 depicts a unit 19 comprising the tuned circuit 3 of FIG. 2 and a rubber coating composition 20 which covers the circuit 3 on at least one of the faces 2a of the substrate 2. The unit 19 comprises an external face 19a and is intended to be incorporated in a tread 21 of a tire 22 (see FIG. 5) with a view to detecting wear information on the tread 21, as will be explained below.

The coating composition 20 is identical to the composition that constitutes the tread.

Naturally, the detection unit 19 could comprise in the same way the tuned circuit 10 according to FIG. 3, or any other tuned circuit according to the invention comprising more than two capacitors connected in parallel and electrically connected to the coil 1.

In the example in FIG. 4, the detection unit 19 has a parallelepiped shape. It will be seen below that this unit 19 can have any geometry adapted to the chosen type of incorporation in the tread 21.

Figure 5:
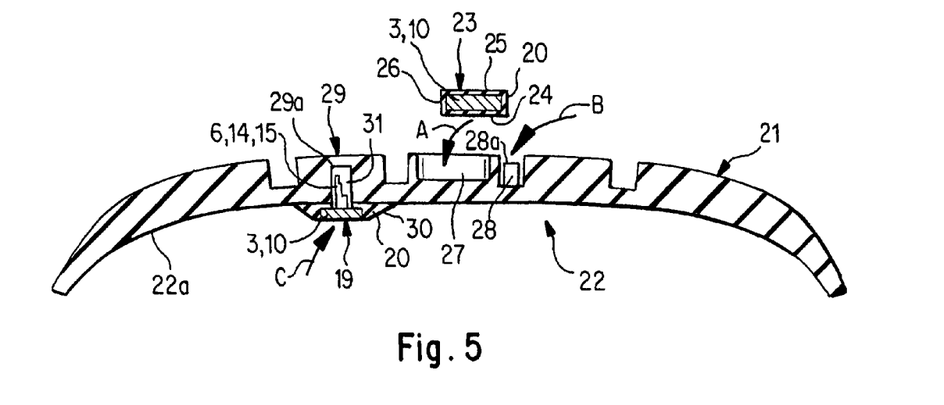
FIG. 5 is a partially exploded schematic view in cross-section of a part of a tire according to the invention illustrating selected various tread pattern elements which are instrumented according to different embodiments of the invention and which each comprise a tuned circuit according to the invention.

FIG. 5 illustrates, by the arrow A, a first embodiment of an instrumented tread pattern element 23 of the tread 21 according to the invention.

This instrumented tread pattern element 23 has the shape of a parallelepiped block or rib, and is typically delimited by a base 24, an external face 25 intended to contact and wear on the ground during the running of the tire 22 and by lateral faces 26 connecting the external face 25 to the base 24. According to the invention, this element 23 comprises the aforementioned detection unit 19.

The tread pattern element 23 thus comprises the tuned circuit 3 or 10 and the rubber coating composition 20, which is identical to the composition of the tread 21.

It should be noted that this element 23 must be such that the web 6c of the wire 6 or the webs 14c, 15c of the wires 14, 15 form respectively the aforementioned loop or loops as inverted U's which are situated below the external face 25 of the element 23 (i.e. these webs 6c, 14c, 15c are not flush with the surface of the external face 25).

In the example of the tuned circuit 3 in FIG. 2 comprising only one wire 6 in an inverted U, it should be noted that the distance between the web 6c of the wire 6 and the external face 25 of the element 23 is designed so as to define a critical wear level to be detected for the tread 21 (this distance being in particular determined by the height of the loop formed by the wire 6).

In the example of the tuned circuit 10 in FIG. 3 comprising two wires 14 and 15 in an inverted U, it will be noted that the distance $d_1$ between the web 15c of the wire 15 which is furthest away from the substrate 2 and the external face 25 of the element 23 is designed to define an intermediate wear level to be detected for the tread 21, whilst the distance $d_2$ (greater than $d_1$) between the web 14c of the other wire 14 (which is closest to the substrate 2) and the external face 25 is designed to define the critical wear level to be detected (these distances being in particular determined by the heights of the loops respectively formed by wires 14 and 15).

This tread pattern element 23 was incorporated in the tread 21 when the latter was manufactured, by connecting the base 24 of the element 23 with a location 27 on the tread 21 which is provided for this purpose. As can be seen in FIG. 5, this location 27 has for example the form of a cavity with a rectangular cross-section which is intended to receive the element 23.

This incorporation of the tread pattern element 23 in the tread 21 can be effected before the curing of the latter, by a suitable positioning of the element 23 inside the curing mould (not shown), or after curing, using known techniques peculiar to the retreading of tires (by means of special adhesive and heat treatment).

The arrow B in FIG. 5 illustrates a second embodiment of an instrumented tread pattern element 28 according to the invention.

This tread pattern element 28 consists of a "wear indicator", i.e. an element for example in the form of a block or rib with a height substantially less than that of the tread patterns on the tread 21.

Like the tread pattern element 23 according to the first embodiment, the element 28 comprises the aforementioned detection unit 19, i.e. the tuned circuit 3 or 10 as well as the rubber coating composition 20, which is still identical to the composition of the tread 21.

It should be noted that this element 28 must be such that the web 6c of the wire 6 or the webs 14c, 15c of the wires 14,15 forming respectively the aforementioned loop or loops in an inverted U which it comprises are not flush with the surface of the external face 28a of the element 28.

As with the aforementioned first embodiment, it should be noted that, in the example of the tuned circuit 3 of FIG. 2 comprising a single wire 6 in an inverted U, the distance between the web 6c of the wire 6 and the external face 28a of the element 28 is designed to define a critical wear level to be detected for the tread 21 and that, in the example of the tuned circuit 10 in FIG. 3 comprising two wires 14 and 15 in an inverted U, the distance $d_1$ between the web 15c of the wire 15 which is furthest away from the substrate 2 and the external face 28a is designed to define an intermediate wear level to be detected for the tread 21, whilst the distance $d_2$ (greater than $d_1$) between the web 14c of the other wire 14 (which is closest to the substrate 2) and the external face 28a is designed to define the critical wear level to be detected.

This tread pattern element 28 was incorporated in the tread 21 during the manufacture thereof, like the tread pattern element 28 of the first embodiment, for example by adhesive bonding to the bottom of a groove of the tread 21.

The arrow C in FIG. 5 illustrates a third embodiment of an instrumented tread pattern element 29 according to the invention.

This tread pattern element 29 consists of a block with a parallelepiped shape or a rib, and is provided in its mass with the detection unit 19, which extends radially through the tire 22 from the radially internal face 22a of the tire 22 (corresponding to the internal rubber compound) and as far as the inside of the block or rib forming the element 29.

As can be seen in FIG. 5, the unit 19 has substantially the shape of a tack (i.e. a flat head 30 on which a stem 31 is mounted), so that the substrate 2 of the tuned circuit 3 or 10 is contained in the head 30 and the wire 6 or the wires 14, 15 in an inverted U extend from the head 30 along the stem 31.

Inside the unit 19, the whole of the tuned circuit 3, 10 is covered with the coating composition 20, which is for example identical to that of the tread 21.

As before, it should be noted that this instrumented tread pattern element 29 should be such that the web 6c of the wire 6 or the webs 14c, 15e of the wires 14, 15 which it comprises are not flush with the surface of the external face 29a of the element 29.

As with the aforementioned first and second embodiments, it should be noted that, in the example of the tuned circuit 3 in FIG. 2 comprising a single wire 6 in an inverted U shape, the distance between the web 6c of the wire 6 and the external face 29a of the element 29 is designed to define a critical wear level to be detected for the tread 21 and that, in the example of the tuned circuit 10 in FIG. 3 comprising two wires 14 and 15 in an inverted U shape, the distance $d_1$ between the web 15c of the wire 15 which is further away from the substrate 2 and the external face 29a is designed to define an intermediate wear level to be detected for the tread 21 whilst the distance between the web 14c of the other wire 14 (which is closer to the substrate 2) and the external face 29a is designed to define the critical wear level to be detected.

The head 30 of the unit 19 is mounted in contact with the radially internal face 22a of the tire 22 by means of a shoulder formed by its internal fixing face 30 with the stem 31.

The head 30 can have any appropriate geometry (circular, rectangular, etc cross-section) provided that it matches the shape of this internal face 22a at the location provided for its fixing. This head 30 can advantageously exhibit a broadening of its section in the direction of its internal fixing face (frustoconical or pyramidal shape, for example).

As for the stem 31 of the unit, this can also have various geometries, for example prismatic or cylindrical in shape.

The unit 19 was incorporated in the tire 22 when the latter was manufactured, by connecting the shoulder 30a of the head 30 and the stem 31 with a location in the tire 22 which is provided for this purpose. This location has for example the form of a cavity with a rectangular or circular cross-section which is intended to receive the stem 31.

This incorporation of the unit 19 in the tire 22 can be effected before the latter is cured, by means of a suitable positioning of the element 23 inside the curing mould, or after curing, by means of a particular adhesive.

Figure 7:
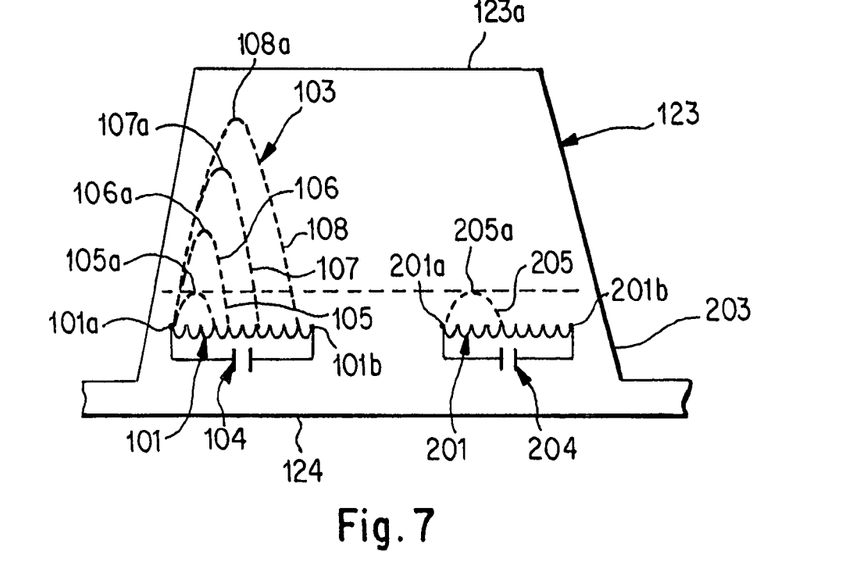
FIG. 7 is a schematic view in section illustrating two other variant embodiments of a tuned circuit included in a tread pattern element according to the invention.

In FIG. 7 two other variant embodiments of a tuned circuit 103 of the LC type according to the invention are illustrated, each variant being shown included in a tread pattern element 123 according to the invention.

The tuned circuit 103 according to the first variant (left-hand part of FIG. 7) comprises a coil 101 at the terminals 101a and 101b of which a capacitor 104 is connected. This coil 101 is printed on a flat substrate (not shown) and is provided with four conductive short-circuit lines 105 to 108 connecting one and the same terminal 101a of the coil 101 to four turns thereof, respectively. Each line 105 to 108 forms a loop in an inverted U or V comprising a vertex 105a to 108a which is contained inside the tread pattern element 123 and which is directed towards the external face 123a of the latter.

It can be seen in FIG. 7 that these vertices 105a to 108a are situated at different heights in the radial direction of the element 123, the radial heights of these vertices 105a to 108a decreasing in the direction of the lines 105 to 108 which are connected to turns close to the terminal 101a, and to the lines 105 to 108.

The tuned circuit 203 according to the second variant (right-hand part of FIG. 7) comprises a coil 201 at the terminals 201a and 201b of which a capacitor 204 is connected. This coil 201 is also printed on a flat substrate (not shown) and is provided with a single conductive short-circuit line 205 connecting a terminal 201a of the coil to a turn thereof. This line 205 comprises a vertex 205a which is contained inside the tread pattern element 123 and which is directed towards the external face 123a of the latter.

In relation to these two variant embodiments of tuned circuits 103, 203, the external face 123a of the tread pattern element 123 corresponding to a critical wear level whose effect on the tuned circuit 103, 203 will be commented on below has been shown in dotted lines in FIG. 7.

It should be noted that the aforementioned description in relation to FIG. 5 of these tread pattern elements 23, 28, 29 according to three embodiments of the invention (arrows A, B or C) applies mutatis mutandis to the tuned circuits 103 or 203 of FIG. 7, replacing the webs 6c, 14c, 15c of the wires 6, 14, 15 with the vertices 105a, 106a, 107a, 108a or 205a of the bypass lines 105, 106, 107, 108 or 205.

Figure 6:
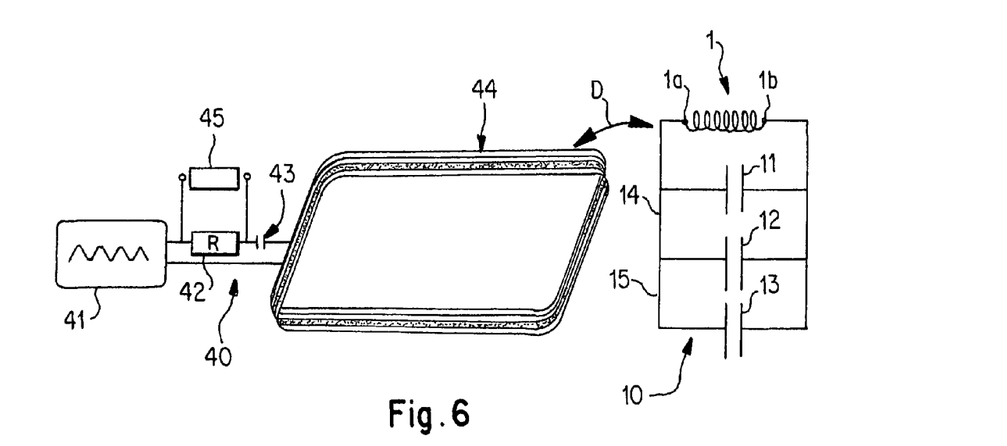
FIG. 6 depicts simplified electrical diagrams of an interrogation circuit and of a tuned circuit according to the invention coupled electromagnetically, in the wear measuring system according to the invention.

FIG. 6 depicts in a simplified manner an interrogation circuit 40 and a tuned circuit according to the invention, such as the circuit 10, which are coupled electromagnetically in order to form the wear measurement system according to the invention. In this example, the aforementioned tuned circuit 10 is shown in relation to FIG. 3 comprising the three capacitors 11, 12, 13 connected in pairs to each other by the bypass branches 14 and 15, the capacitor 11 being connected to the terminals of the coil 1. It will be understood that any other tuned circuit according to the invention (such as the circuit 103 or 203 for example) could figure in place of this circuit 10.

The interrogation circuit 40 can be mounted on a fixed or movable part of the vehicle which is situated facing the tire 22 according to the invention.

As a fixed part, it is possible for example to cite part of the chassis of the vehicle, and the interrogation circuit 40 can then be mounted on a wall of the chassis corresponding to the wheel passage area, such as the "mudguard".

Figure 8:
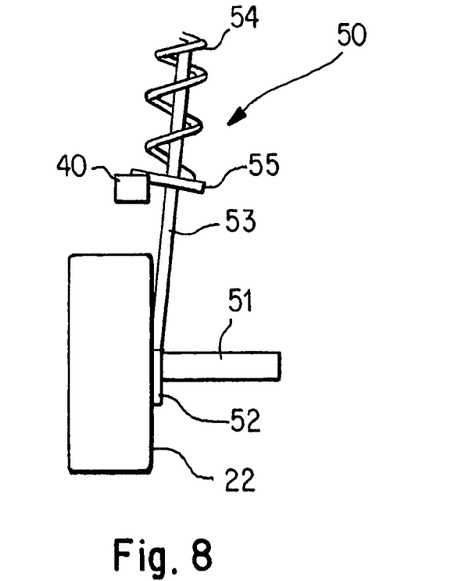
FIG. 8 is a schematic partial front view of a suspension device provided with an interrogation circuit according to the invention to which there is coupled a tuned circuit included in the adjacent tire for measuring the wear thereon.

With reference to FIG. 8, it is also possible to cite by way of the fixed part of the chassis a part of a suspension device 50, which is intended to provide a flexible connection between the chassis of a motor vehicle (not shown) and each wheel of the vehicle, on which the tire 22 is mounted (the corresponding wheel is not visible in FIG. 8). An axle 51 on which the wheel is mounted by means of a journal 52 is also depicted partially in FIG. 8.

The suspension device 50 comprises essentially a suspension arm 53 provided with a damping spring 54 whose seat bears on a damper cup 55 forming a fixed stop for the spring 54 (the impact stop of this spring adjacent to the chassis is not shown), the interrogation circuit 40 being mounted on this cup 55.

With a movable part, it is possible to cite for example the wheel on which the tire 22 is mounted, and the interrogation circuit 40 can then be mounted directly on the wheel rim, on the valve of the wheel or on an internal pressure measurement module with which the wheel is provided.

In the example embodiment in FIG. 6, the interrogation circuit 40 comprises a frequency-sweep energy generator 41, a resistance 42, a capacitor 43 and an antenna 44 formed by a coil which is intended to be coupled to the coil 1 of the tuned circuit 3 or 10. It should be noted that this circuit 40 could be without a resistance 42, i.e. comprising a capacitor 43 associated with a coil 44.

The interrogation circuit 40 is provided with a means 45 of detecting the tuning frequencies (also referred to as resonant frequencies) between the tuned circuit 3 or 10 and the interrogation circuit 40. This detection means 45 is advantageously connected to the terminals of the resistance 42 and is for example intended to measure the amplitude of the voltage at these terminals, which passes through an optimum (energy absorption) when there is frequency tuning between the two circuits 3 or 10 and 40.

In addition, the interrogation circuit 40 is provided with transmission means designed to transmit tuning frequency information to a central unit mounted inside the vehicle according to the invention, which central unit is intended to inform the driver of the wear on the tread 21.

The wear measuring system according to the invention, which comprises a passive tuned circuit 3, 10, 103, 203 (with reference to one of FIGS. 2, 3, 5, 7) and an interrogation circuit 40, such as the one in FIG. 6, functions as follows.

The supply frequency of the generator 41 is varied and the voltage at the terminals of the resistance 42 is measured in order to determine the tuning frequency of the tuned circuit 3, 10, 103, 203 with the interrogation circuit 40 which is coupled to it.

According to the invention, there is derived from the tuning frequency value detected at a given moment wear information on the tread 21 comprising the tuned circuit 3, 10, 103, 203, as will be detailed below.

In the example in FIG. 2 where the tuned circuit 3 comprises a single wire 6 in an inverted U connecting together the two capacitors 4 and 5 with respective capacitances $C_1$ and $C_2$, whilst the wear on the external face 25, 28a, 29a of the tread pattern element 23, 28, 29 does not have the effect of cutting the web 6c of the wire 6, the detection means 45 of the circuit 40 detect a tuning frequency $f_1$ given by the following equation:

$$f_1 = 1/[2\pi\sqrt{L(C_1+C_2)}],$$

L being the inductance (expressed in henrys) of the coil 1 of the tuned circuit 3.

The transmission means of the circuit 40 transmit this tuning frequency information (value $f_1$) to the central unit of the vehicle or to a portable unit, which on request informs the user that the tread 21 of the tire 22 has not yet reached a predetermined critical degree of wear.

After the breaking of the web 6c of the wire 6 by wear on the external face 25, 28a, 29a, the detection means 45 of the circuit 40 detect a tuning frequency $f_2$ greater than $f_1$, which is given by the following equation (the capacitor 5 being cut off, only the capacitor 4 is then connected to the terminals of the coil 1):

$$f_1 = 1/[2\pi\sqrt{LC_1}].$$

The transmission means of the circuit 40 transmit this tuning frequency information (value $f_2$) to the central unit of the vehicle, which informs the driver that the tread 21 of the tire 22 has reached the predetermined critical degree of wear.

In the example in FIG. 3 where the tuned circuit 10 comprises two wires 14 and 15 in an inverted U connecting the three capacitors 11, 12, 13 with respective capacitances $C'_2$, $C'_3$ in pairs to each other as long as the wear on the external face 25, 28a, 29a of the tread pattern element 23, 28, 29 has not had the effect of cutting the web 15c of the wire 15 which is closest to the external face 25, 28a, 29a (i.e. the web 15c furthest away from the substrate 2), the detection means 45 of the circuit 40 detect a tuning frequency $f_3$ given by the following equation:

$$f_1 = 1/[2\pi\sqrt{L(C'_1+C'_2+C'_3)}].$$

The transmission means of the circuit 40 transmit this tuning frequency information (value $f_3$) to the central unit of the vehicle or to a portable unit, which on request informs the user that the tread 21 of the tire 22 has not yet reached a predetermined intermediate wear threshold (corresponding to the radial position of the web 15c of the wire 15 in the tread 21).

After this web 15c is broken by wear on the external face 25, 28a, 29a and as long as the web 14c of the wire 14 which is furthest away from the external face 25, 28a, 29a (i.e. the closest to the substrate 2) is not broken, the detection means 45 of the circuit 40 detect a tuning frequency $f_4$ greater than $f_3$, which is given by the following equation (the third capacitor 13 being cut off, only the capacitors 11 and 12 are then connected to the terminals of the coil 1):

$$f_1 = 1/[2\pi\sqrt{L(C'_1+C'_2)}].$$

The transmission means of the circuit 40 transmit this tuning frequency information (value $f_4$) to the central unit, which informs the user that the tread 21 of the tire 22 has reached the predetermined intermediate wear threshold.

After the cutting of the web 14c of the wire 14 by increased wear on the external face 25, 28a, 29a, the detection means 45 of the circuit 40 detect a tuning frequency $f_5$ greater than $f_4$, given by the following equation (the second capacitor 12 being in its turn cut off, only the capacitor 11 is connected to the terminals of the coil 1):

$$f_5 = 1/[2\pi\sqrt{L(C'_1)}].$$

The transmission means of the circuit 40 transmit this tuning frequency information (value $f_5$) to the central unit, which informs the user that the tread 21 of the tire 22 has reached a predetermined critical wear threshold (corresponding to the radial position of the web 14c of the tread 21).

In the first variant embodiment of the example in FIG. 7 where the tuned circuit 103 comprises four short-circuit lines 105 to 108 connected to the coil 101, as long as the wear on the external face 123a of the tread pattern element 123 has not had the effect of cutting the vertex 108a of the short-circuit line 108 which is closest to the external face 123a, the detection means 45 of the circuit 40 detect a maximum tuning frequency $f_0$ (corresponding to a minimum value for the inductance of the coil 101).

The transmission means of the circuit 40 transmit this tuning frequency information $f_0$ to the central unit of the vehicle or to a portable unit, which on request informs the user that the tread 21 of the tire 22 has not yet reached a first predetermined intermediate wear threshold corresponding to the radial position of the vertex 108a in the tread 21.

After the breaking of this vertex 108a by wear on the external face 1 23a and as long as the radially lower adjacent vertex 107a has not been cut, the detection means 45 of the circuit 40 detect a tuning frequency 11 lower than $f_0$ (corresponding to a higher value of the inductance). The transmission means of the circuit 40 transmit this tuning frequency information $f_1$ to the central unit, which informs the user that the tread 21 has reached the first predetermined intermediate wear threshold.

After the breaking of the vertex 107a of the short-circuit line 107 by further increased wear on the external face 123a and as long as the immediately lower vertex 106a has not been broken, the detection means 45 detect a tuning frequency $f_2$ lower than $f_1$ (corresponding to an even higher value of the inductance). The transmission means of the circuit 40 transmit this tuning frequency information $f_2$ to the central unit, which informs the user that the tread 21 has reached a second predetermined intermediate wear threshold corresponding to the radial position of the vertex 107a in the tread 21.

After the breaking of the vertex 106a of the short-circuit line 106 by further increased wear on the external face 123a and as long as the immediately lower vertex 105a has not been broken, the detection means 45 detect a tuning frequency $f_3$ lower than $f_2$ (corresponding to an even higher value of the inductance). The transmission means of the circuit 40 transmit this tuning frequency information $f_3$ to the central unit, which informs the user that the tread 21 has reached a third predetermined intermediate wear threshold corresponding to the radial position of the vertex 106a in the tread 21.

After the breaking of the vertex 105a of the short-circuit line 105 by further increased wear on the external face 123a (which then appears in dotted lines in FIG. 7), the detection means 45 detect a tuning frequency $f_4$ lower than $f_3$ (corresponding to an even higher value of the inductance). The transmission means of the circuit 40 transmit this tuning frequency information $f_4$ to the central unit, which informs the user that the tread 21 has reached a fourth and last (critical) predetermined wear threshold corresponding to the radial position of the vertex 105a in the tread 21.

In the second variant embodiment of the example in FIG. 7 where the tuned circuit 103 comprises only one short-circuit line 205 mounted on the coil 201, as long as the wear on the external face 123a of the tread pattern element 123 has not had the effect of breaking the vertex 205a of this line 205, the detection means 45 of the circuit 40 detect a maximum tuning frequency $f_0$ (corresponding to a minimum value of the inductance of the coil 201). The transmission means of the circuit 40 transmit this tuning frequency information $f_0$ to the central unit, which on request informs the user that the tread 21 of the tire 22 has not yet reached a predetermined critical wear threshold corresponding to the radial position of the vertex 205a in the tread 21.

After the breaking of this vertex 205a by wear on the external face 123a (which then appears in dotted lines in FIG. 7), the detection means 45 of the circuit 40 detect a tuning frequency $f_1$ less than $f_0$ (corresponding to a higher value of the inductance). The transmission means of the circuit 40 transmit this tuning frequency information $f_1$ to the central unit, which informs the user that the tread 21 has reached the predetermined critical wear threshold.

In conclusion, it should be noted that the wear measurement system according to the invention has the advantage of comprising only one passive electrical circuit inside the tire 22, because the wear detection is effected at a distance by the detection means 45 (whether on a fixed part of the vehicle or on the wheel).

What is claimed is:

1. A detection unit for a tire to measure wear, comprising:
    a passive electrical circuit covered with a rubber composition forming a block compatible with the tread of a tire, the circuit comprising a coil printed on a substrate and a quantity
    n (n≧1) capacitors connected in parallel to the terminals of the coil, and
    conductor means extending from the passive electrical circuit into the rubber composition block, wherein wear on the rubber composition block causes a change in the resonant frequency of the passive electrical circuit.

2. The detection unit of claim 1, wherein, the coil includes at least one short-circuit lines each comprising a vertex which is contained inside the rubber composition block, the vertices being situated at different heights relative to the coil.

3. The detection unit according to claim 2, wherein, in the first case, the coil is provided with a short-circuit line connecting a terminal of the coil to a turn thereof.

4. The detection unit according to claim 2, wherein, the coil includes a quantity
    (m≧2) short-circuit lines connecting one and the same terminal of the coil to m turns thereof, the respective heights of the vertices relative to the coil decreasing in the direction of the turns approaching the terminal.

5. The detection unit of claim 1, wherein, each capacitor includes at least one branch in parallel, each branch comprising a vertex which is contained inside the rubber composition block, adjacent pairs of capacitors being connected together by at least one branch, wherein the vertex of the at least one branch connecting adjacent pairs of capacitors being situated at different heights relative to the capacitors.

6. The detection unit according to claim 5, wherein, the passive circuit comprises two capacitors connected in parallel to the terminals of the coil and which are connected together by not more than two branches in parallel, the vertices of the not more than two branches extending to a single height from the capacitors for detecting a single wear threshold of the tread pattern element containing the vertex.

7. The detection unit according to claim 5, wherein, the passive circuit comprises at least three capacitors which are connected in parallel to the terminals of the coil and which are connected in pairs to each other by not more than two branches in parallel, wherein the circuit comprises at least two branches whose respective vertices occupy different heights relative to the capacitors for detecting at least two wear thresholds on the tread pattern element containing the vertices.

8. A tread pattern element for a tire intended to be attached to the tread of the tire for measuring wear in the tread, comprising a base to be connected to the tread, an external surface intended for contact with the ground and a passive electrical circuit disposed between the base and the external surface, the passive electrical circuit comprising a coil printed on a substrate and a quantity n (n≧1) capacitors connected in parallel to the terminals of the coil, and conductor means extending from the passive electrical circuit toward the external surface and recessed therefrom, wherein, wear on the tread pattern element causes a change in the resonant frequency of the passive electrical circuit.

9. A tread for a tire, comprising at least one tread pattern element for measuring wear in the tread, each comprising a base, an external surface intended for contact with the ground and a passive electrical circuit disposed between the base and the external surface, the passive electrical circuit comprising a coil printed on a substrate and a quantity n (n≧1) capacitors connected in parallel to the terminals of the coil, and conductor means extending from the passive electrical circuit toward the external surface and recessed therefrom, wherein, wear on the tread pattern element causes a change in the resonant frequency of the passive electrical circuit.

10. The tread according to claim 9, wherein said conductor means comprises a conductive short-circuit loop disposed substantially parallel to the external surface of the tread and which connects together the terminals of the tuned circuit, for measuring the wear across at least a portion of a width of the tread when wear on the external surface breaks the short-circuit loop.

11. A tire having a tread comprising at least one tread pattern element for measuring wear in the tread, each comprising a base, an external surface intended for contact with the ground and a passive electrical circuit disposed between the base and the external surface, the passive electrical circuit comprising a coil printed on a substrate and a quantity n (n≧1) capacitors connected in parallel to the terminals of the coil, and conductor means extending from the passive electrical circuit toward the external surface and recessed therefrom, wherein, wear on the tread pattern element causes a change in the resonant frequency of the passive electrical circuit.

12. A tire having a carcass reinforcement, a crown reinforcement radially surmounting the carcass reinforcement, side walls extending laterally from the crown reinforcement, and a tread comprising tread pattern elements radially surmounting the crown reinforcement, the tread having a detection unit for detecting wear, the unit being substantially in the shape of a tack having a head connected to a radially internal face of the tire facing one of the tread pattern elements, and having a stem extending radially through the tire from the head into a tread pattern element, the stem further comprising a passive electrical circuit, the passive electrical circuit comprising a coil printed on a substrate and a quantity n (n≧1) capacitors connected in parallel to the terminals of the coil, and conductor means extending from the passive electrical circuit toward the external surface and recessed therefrom, wherein, wear on the tread pattern element causes a change in the resonant frequency of the passive electrical circuit.

13. A tire/wheel assembly for a motor vehicle comprising:
a wheel and a tire mounted on the wheel, the tire having a tread comprising at least one tread pattern element for measuring wear in the tread, each tread pattern element comprising a base, an external surface intended for contact with the ground and a passive electrical circuit disposed between the base and the external surface, the passive electrical circuit comprising a coil printed on a substrate and a quantity n (n≧1) capacitors connected in parallel to the terminals of the coil, and conductor means extending from the passive electrical circuit toward the external surface and recessed therefrom, wherein, wear on the tread pattern element causes a change in the resonant frequency of the passive electrical circuit, and
an active interrogation circuit mounted fixedly to the wheel and coupled to the passive electrical circuit, the active interrogation circuit comprising a frequency-sweep energy generator and means of detecting the tuning frequencies between the passive circuit and the interrogation circuit.

14. The tire/wheel assembly according to claim 13, wherein the interrogation circuit further comprises a capacitor, a resistance and a coil coupled to the coil of the passive circuit.

15. The tire/wheel assembly according to claim 14, wherein the means of detecting the tuning frequency is connected to the terminals of the resistance to measure the voltage at the terminals.

16. The tire/wheel assembly according to claim 13, wherein the interrogation circuit is mounted on one of the rim of the wheel or an inflation valve of the wheel.

17. The tire/wheel assembly according to claim 13, wherein the interrogation circuit is mounted on a module for measuring the pressure internal to the tire with which the wheel is provided.

18. The tire/wheel assembly according to claim 13, wherein the interrogation circuit further comprises transmission means to transmit tuning frequency information to a central unit configured to inform a user that at least one predetermined wear threshold of the tire has been reached.

19. A motor vehicle having a chassis, tire/wheel assemblies and a suspension providing a resilient connection between the chassis and the tire/wheel assemblies,
at least one tire having a tread comprising at least one tread pattern element for measuring wear in the tread, each comprising a base, an external surface intended for contact with the ground and a passive electrical circuit disposed between the base and the external surface, the passive electrical circuit comprising a coil printed on a substrate and a quantity
n (n≧1) capacitors connected in parallel to the terminals of the coil, and conductor means extending from the passive electrical circuit toward the external surface and recessed therefrom, wherein, wear on the tread pattern element causes a change in the resonant frequency of the passive electrical circuit, and
an active interrogation circuit to which the passive electrical circuit contained in the tire is coupled mounted on one of the chassis or the suspension, the interrogation circuit comprising a frequency-sweep energy generator and means for detecting the tuning frequencies between the passive circuit and the interrogation circuit.

20. A motor vehicle according to claim 19, wherein the interrogation circuit further comprises a capacitor, a resistance and a coil coupled to the coil of the passive circuit.

21. A motor vehicle according to claim 20, wherein the means of detecting the tuning frequency is connected to the terminals of the resistance to measure the voltage at these terminals.

22. A motor vehicle according to claim 19, wherein the interrogation circuit is mounted on a wall of the chassis corresponding to the wheel passage area.

23. A motor vehicle according to claim 19, wherein the interrogation circuit is mounted on a stop of a damping spring of the suspension.

24. A motor vehicle according to claim 19, wherein the interrogation circuit further comprises transmission means to transmit tuning frequency information to a central unit configured to inform a user that a predetermined wear threshold of the tire has been reached.

25. A system of detecting wear on a tire at one or more predetermined wear thresholds, comprising:
- a passive electrical circuit covered with a rubber composition forming a block compatible with the tread of a tire, the circuit comprising a coil printed on a substrate and a quantity
- n (n≧1) capacitors connected in parallel to the terminals of the coil, and conductor means extending from the passive electrical circuit into the rubber composition block, wherein wear on the rubber composition block causes a change in the resonant frequency of the passive electrical circuit and,
- an active interrogation circuit coupled to the passive circuit, the interrogation circuit comprising a frequency-sweep energy generator and means for detecting tuning frequencies between the passive circuit and the interrogation circuit.

* * * * *